United States Patent [19]
Cromer et al.

[11] Patent Number: 5,945,915
[45] Date of Patent: *Aug. 31, 1999

[54] COMPUTER SYSTEM FOR SENDING AN ALERT SIGNAL OVER A NETWORK WHEN A COVER OF SAID SYSTEM HAS BEEN OPENED

[75] Inventors: Daryl C. Cromer; Thi N. Dang, both of Cary; Jan M. Janick, Morrisville; Howard J. Locker, Cary; David Rhoades, Apex, all of N.C.

[73] Assignee: International Business Machines Corporation, Armonk, N.Y.

[*] Notice: This patent is subject to a terminal disclaimer.

[21] Appl. No.: 08/965,140

[22] Filed: Nov. 6, 1997

[51] Int. Cl.$^6$ ..................................................... G08B 21/00
[52] U.S. Cl. ..................................... 340/686.1; 340/568.1; 340/568.4; 340/571; 340/687
[58] Field of Search ................................. 340/568.1, 571, 340/572.8, 686.1, 568.4, 687, 652

[56] References Cited

U.S. PATENT DOCUMENTS

| | | | |
|---|---|---|---|
| 4,121,201 | 10/1978 | Weathers | 340/524 |
| 4,262,283 | 4/1981 | Chamberlain et al. | 340/568 |
| 4,654,640 | 3/1987 | Carll et al. | 340/568 |
| 4,991,123 | 2/1991 | Casamassima | 364/550 |
| 4,999,621 | 3/1991 | Loeb | 340/571 |
| 5,091,713 | 2/1992 | Horne et al. | 340/541 |
| 5,142,269 | 8/1992 | Mueller | 340/568 |
| 5,231,375 | 7/1993 | Sanders et al. | 340/568 |
| 5,388,156 | 2/1995 | Blackledge, Jr. et al. | 380/4 |
| 5,396,636 | 3/1995 | Gallagher et al. | 395/750 |
| 5,404,544 | 4/1995 | Crayford | 395/750 |
| 5,406,260 | 4/1995 | Cummings et al. | 340/568 |
| 5,689,242 | 11/1997 | Sims et al. | 340/568 |
| 5,715,174 | 2/1998 | Cotichini et al. | 340/568 |

FOREIGN PATENT DOCUMENTS 0713200 5/1996 European Pat. Off. ......... G07G 3/00

OTHER PUBLICATIONS

IBM Technical Disclosure Bulletin, LAN Notification of Tampering, Sep. 1993, vol. 36, No. 9A, pp. 333–334.
Abstract (SA887–0305) 29173 *Theft Detection Means for Use With Coaxial Cables.*

*Primary Examiner*—Nina Tong
*Attorney, Agent, or Firm*—Anthony N. Magistrale

[57] ABSTRACT

Described is a computer system which is coupled to a remote computer via a network cable. The computer system has a normally closed enclosure and is capable of securing data retained within the system against unauthorized access and notifying the remote computer when an unauthorized access has occurred. The computer system includes an erasable memory element mounted within the enclosure for selective activation to active and inactive states and for receiving and storing a security password when in the active state. A manually operable option switch is mounted within the enclosure. The option switch is manually settable by a user of the computer system for setting the memory element to the active and inactive states. A tamper detection switch is mounted within the enclosure and operatively connected with the memory element for detecting opening of the enclosure and for generating a tamper alert signal and clearing any stored security password from the memory element in response to any switching of the tamper switch. The computer system further includes a network connector which is operative to receive the tamper alert signal and upon so receiving, transmit an alert packet over the communication line to the remote computer. The alert packet contains an alert message and information which specifically identifies the computer system.

10 Claims, 5 Drawing Sheets

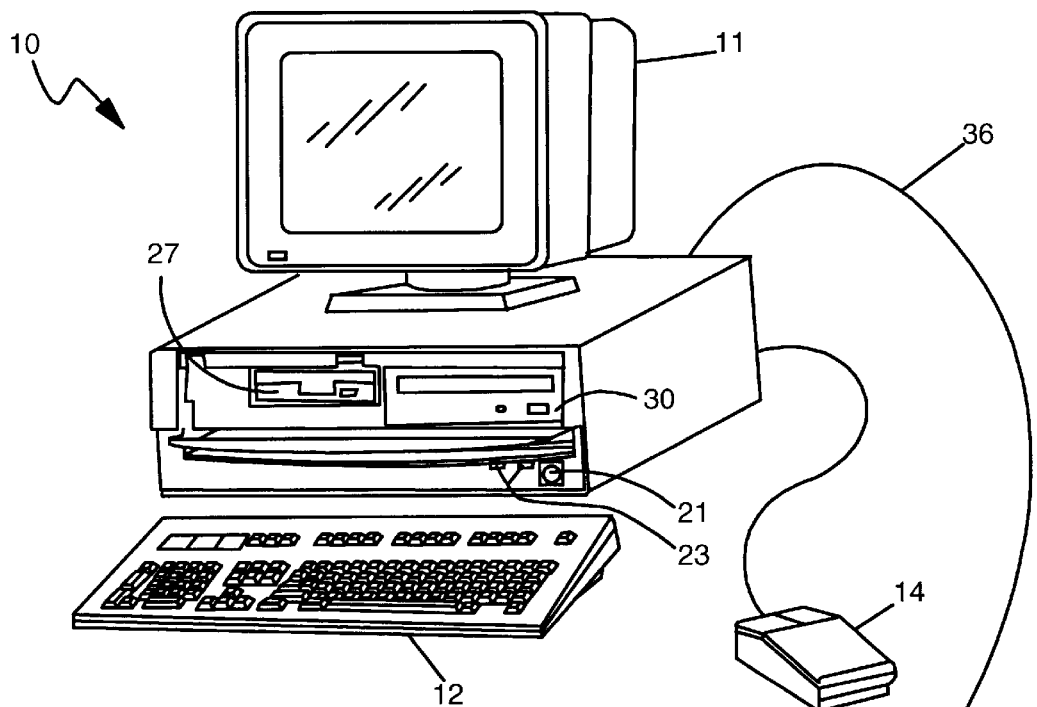
FIG. 1
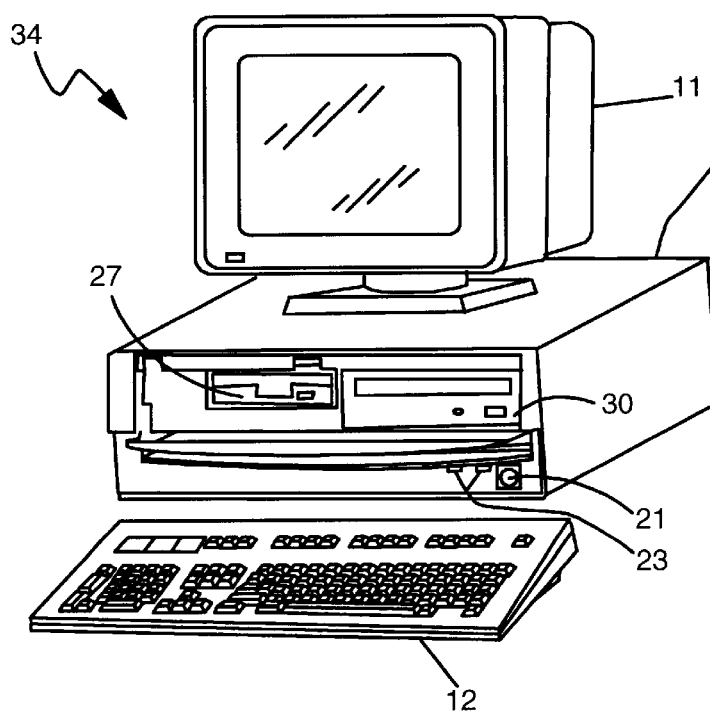

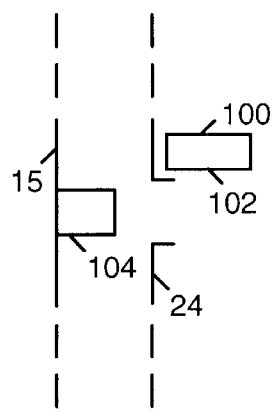
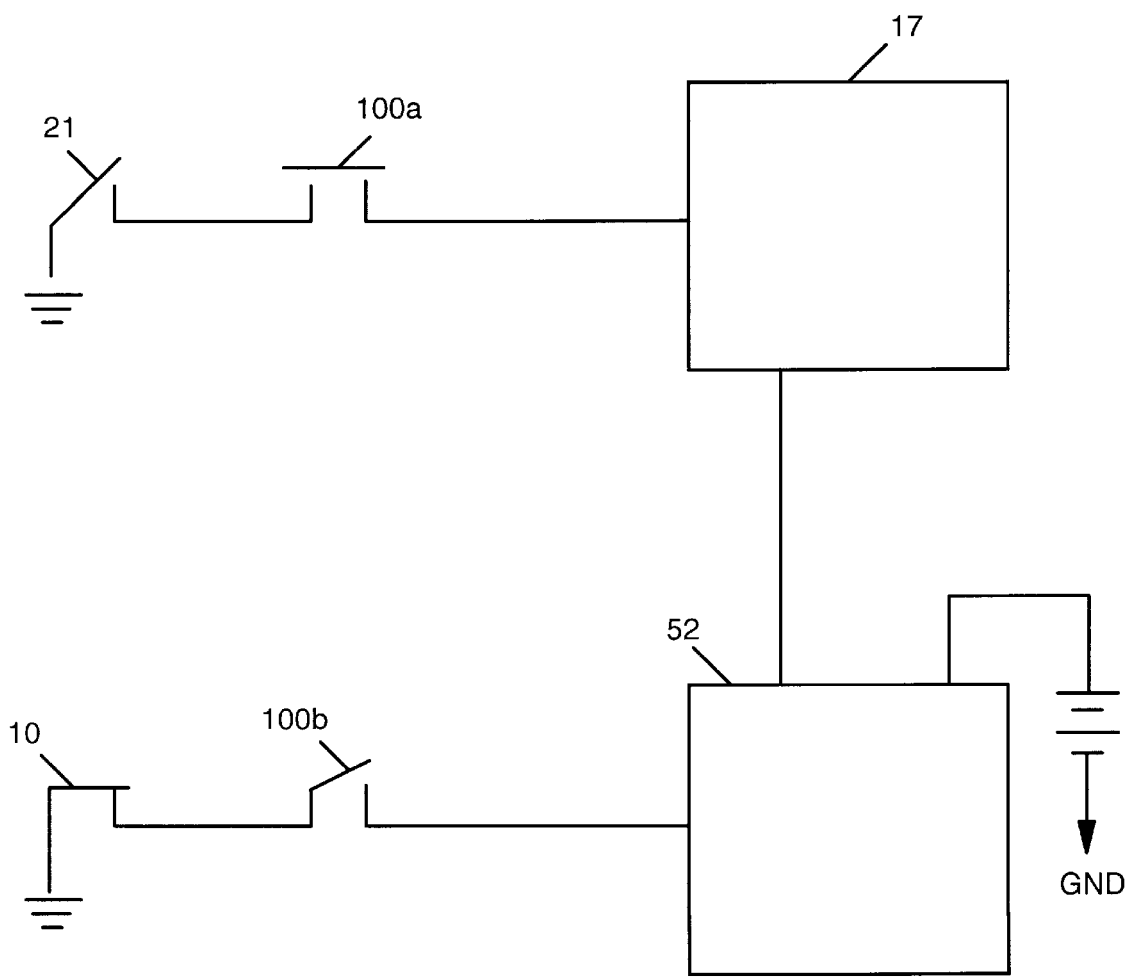

COMPUTER SYSTEM FOR SENDING AN ALERT SIGNAL OVER A NETWORK WHEN A COVER OF SAID SYSTEM HAS BEEN OPENED

BACKGROUND OF THE INVENTION

1. Field of the Invention

The present invention relates to computer systems and more particularly to a computer system having a cover tamper detection switch and being coupled to a network and operative to send an alert message over the network to a network administrator if the cover is opened.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, a fixed disk storage drive (also known as a "hard drive"), a so-called "mouse" pointing device, and an optional printer. One of the distinguishing characteristics of these systems is the use of a motherboard or system planar to electrically connect these components together. Examples of such personal computer systems are IBM's PC 300 series and IBM's Aptiva Series.

Theft of personal computers is becoming a major industry problem. As a result, there has been an ever increasing need to provide security for computer systems against the unauthorized removal or theft thereof. Since modern computer systems are generally more compact and more easily transportable, it is even more difficult to secure against the unauthorized removal or theft thereof.

In addition, today, computer networks are employed to provide efficient computing capabilities throughout a large work area. Existing computer networks generally include a number of remotely located computer systems coupled via a data link to a server system or a central processing center. The wide dissemination of such systems at remote locations has made the systems an even more accessible target for computer thieves.

Accordingly, a number of methods have been developed for guarding against the unauthorized removal of computer systems. For example, U.S. Pat. No. 5,406,260 discloses a method and system for detecting the disconnection of electronic equipment from a network using internal current loops, current sensors and optional alarms. The system includes current loops internally coupled to protected pieces of equipment so that each piece of associated equipment has an associated current loop. A low current power signal is provided to each of the current loops. A sensor monitors the current flow through each current loop to detect removal of the equipment from the network. Removal of a piece of hardware breaks the current flow through the associated current loop which in turn may activate an alarm. However, such systems and methods are very complex and too expensive for today's computer systems.

Another concern for system owners is the breaking into personal computers and theft of memory modules, hard drives and CPUs. These devices are generally compact and have a very high resell value. As a result, such devices are being stolen from corporations and sold on the open market.

Accordingly, a method has been designed to detect the unauthorized opening of a system enclosure. For example, U.S. Pat. No. 5,388,156, owned by the assignee of the present invention and incorporated herein by reference, discloses a personal computer system having security features enabling control over access to data retained in such a system. The system has a normally closed enclosure and at least one erasable memory element for receiving and storing a privileged access password (PAP). The PAP is designed to provide protection for the system owner by protecting the initial program load (IPL) device boot list, access to a password utility and access to the System Reference Diskette or System Partition. The system further includes at least one tamper detection switch mounted within the enclosure and operatively connected with the memory element for detecting opening of the enclosure.

If the system of the '156 patent is in one mode, and the enclosure or cover is removed, the tamper detection switch will change states and will set a segment of the memory element to a distinctive value (e.g., all "1"s). This setting of a memory segment to a distinctive state invalidates any previously stored power on password (POP) for purposes of booting an operating system from any source other than the system reference diskette or the system partition. Booting an operating system from either of the last mentioned sources requires entry of a valid PAP. Since the PAP is only known to the system owner, the person tampering with the system will not be able to access any data stored in the hard files therein.

If the system is in another mode, and the enclosure cover is removed by an unauthorized user, the tamper detection switch will change states and invalidate the PAP. If this occurs, no one can access the data in the system including the system owner. In this situation the system board must be replaced.

However, the system of the '156 patent has a disadvantage in that although a thief cannot access the data in the computer system after the cover is removed, the memory modules and other devices can still be stolen long before the system owner is aware of the theft.

It is therefore desirable to provide a computer system that can send an immediate notification over a network to a remote computer when the computer system's enclosure has been opened.

SUMMARY OF THE INVENTION

The present invention is directed to a computer system and method for sending an alert signal over a network when a cover of the system has been opened. The computer system is coupled to a remote computer via a data communication line. The computer system has a normally closed enclosure and is capable of securing data retained within the system against unauthorized access and notifying the remote computer when an unauthorized access has occurred. The computer system includes an erasable memory element mounted within the enclosure for selective activation to active and inactive states and for receiving and storing a security password when in the active state. A manually operable option switch is mounted within the enclosure. The option switch is operatively connected with the erasable memory element and manually settable by a user of the computer system for setting the erasable memory element to the active and inactive states.

The computer system further includes a tamper detection switch mounted within the enclosure and operatively connected with the erasable memory element for detecting opening of the enclosure and for generating a tamper alert signal and clearing any stored security password from the erasable memory element in response to any switching of the tamper switch. The computer system also includes a central processing unit mounted within the enclosure and operatively connected with the erasable memory element for controlling access to at least certain levels of data stored within the system by distinguishing between the active and inactive states of the memory element and between entry and non-entry of any stored security password.

The computer system further includes a network connector in circuit communication with the CPU. The network connector is operative to receive the tamper alert signal and upon so receiving, transmit an alert packet over the communication line to the remote computer. The alert packet contains an alert message and information which specifically identifies the local computer system.

BRIEF DESCRIPTION OF THE DRAWINGS

FIG. 1 is a perspective view of a personal computer embodying this invention and a LAN station remote computer system;

FIG. 4 is an enlarged view of the cover tamper switch of the personal computer of FIGS. 1 and 2.

FIG. 5 is a schematic representation of certain components of the personal computer of FIGS. 1 and 2.

DETAILED DESCRIPTION OF THE INVENTION

Figure 2:
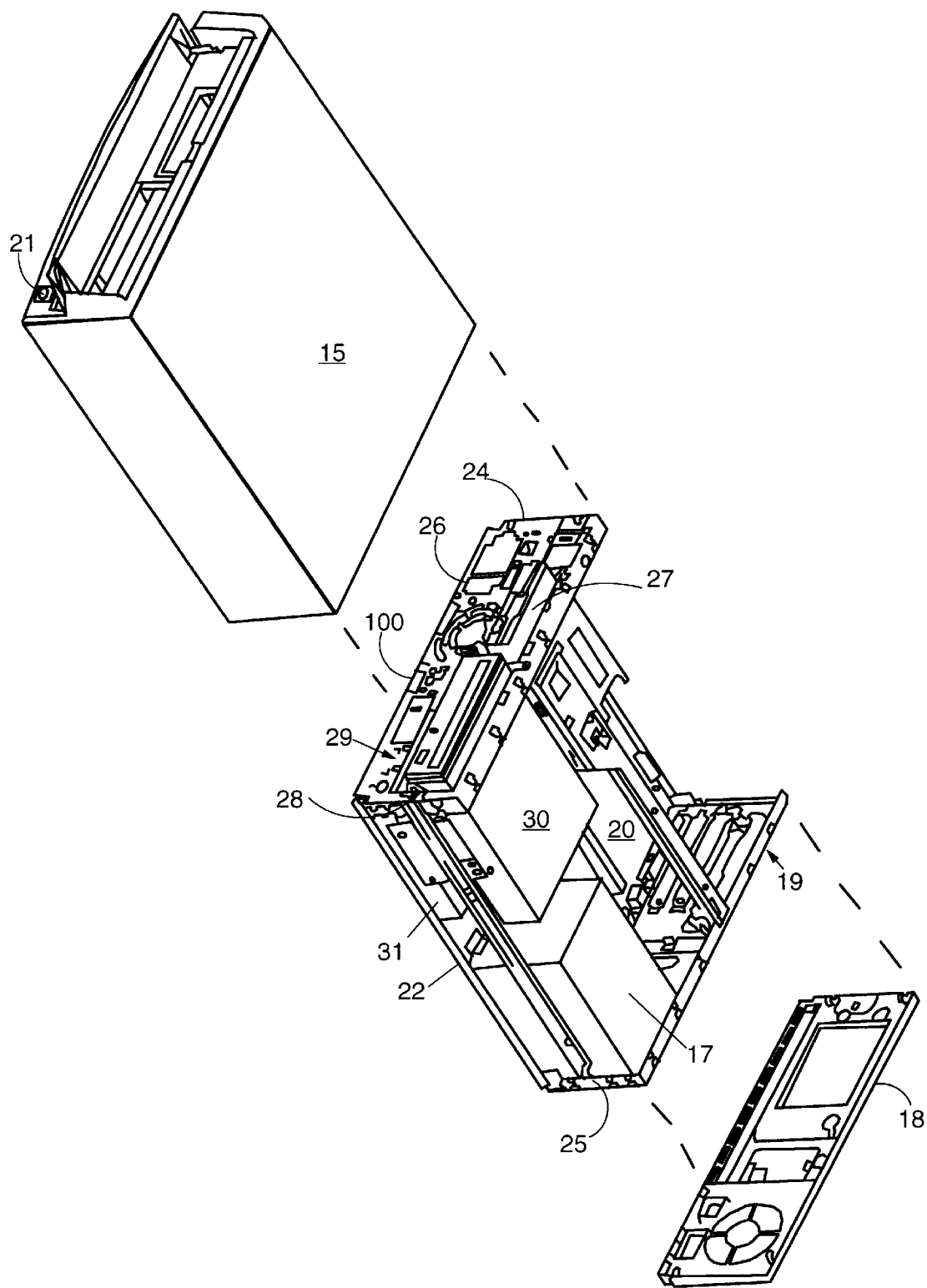
FIG. 2 is an exploded perspective view of certain elements of the personal computer of FIG. 1 including a chassis, a cover, an electromechanical direct access storage device and a planar board and illustrating certain relationships among those elements.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi-layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

The system 10 has a power supply 17, a power button 21, also herein referred to as switch 21, and LEDs 23 for power indication and hard disk activity. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
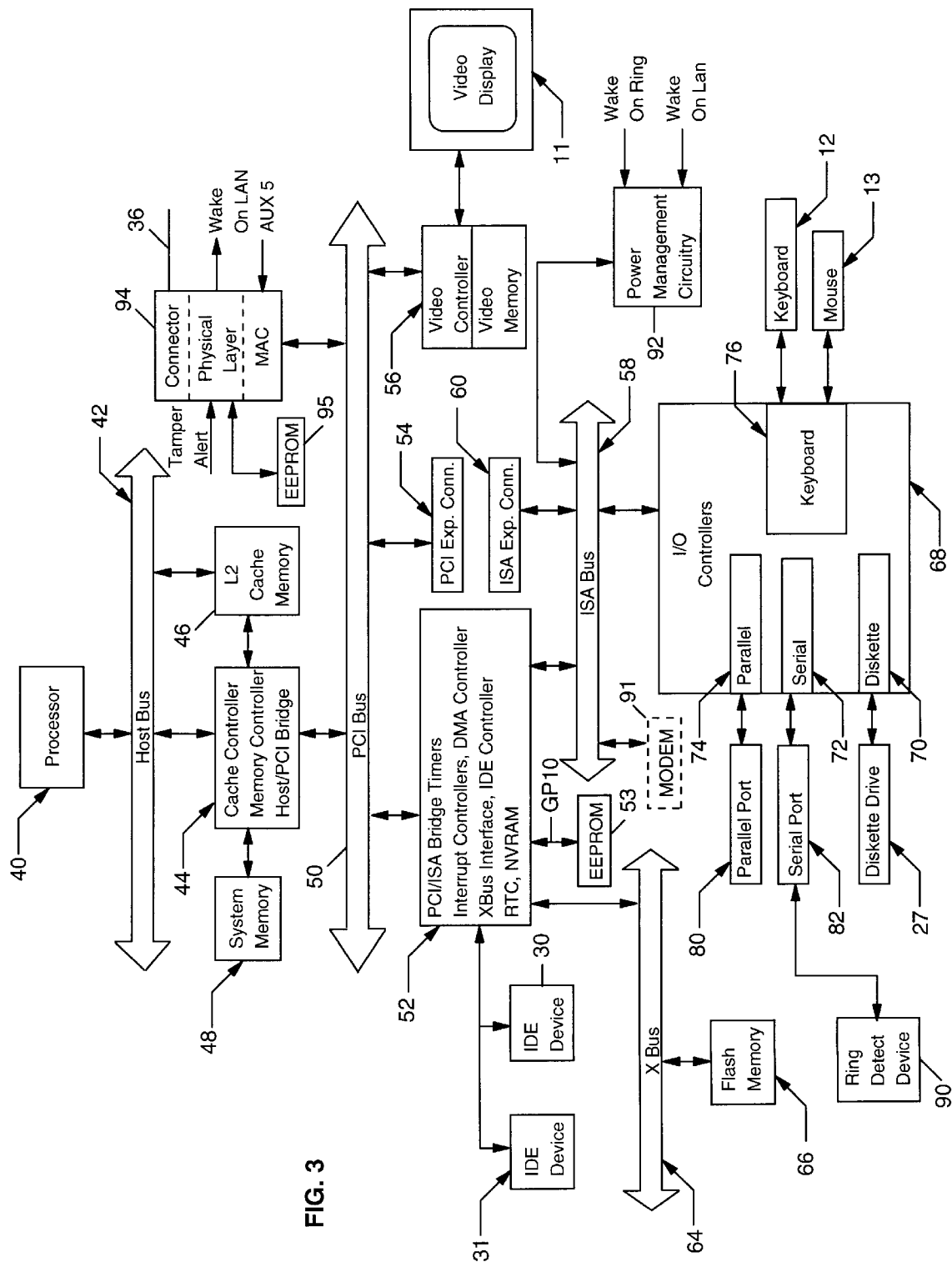
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40 which is connected directly to a high speed CPU host bus 42. A first system core logic chipset 44 and L2 cache memory 46 are also connected to the host bus 42. The first core logic chipset 44 includes a memory control unit, a L2 cache controller and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, an PIIX3 chip which is also sold by Intel Corporation.

The chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an XBus controller, a PCI/ISA bridge and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). ISA adapter cards can be pluggably connected to the ISA expansion connectors 60 and may provide additional IO devices or memory for the system 10.

The IDE controller provides for the attachment of IDE compatible storage devices such as the fixed disk drive 31 and CD-ROM drive 30.

The real-time clock is used for time of day calculations and the NVRAM is used to store system configuration data. That is, the NVRAM will contain values which describe the present configuration of the system 10. For example, NVRAM 96 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Coupled to the ISA bus 58 is a multi-function IO controller 68 such as, for example, a National Semiconductor PC87306. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as ring detect device 90. The parallel adapter 74 has an external port connector 80 for attachment of external devices such as printers (not shown). The keyboard controller 76 is the interface for the keyboard 12 and the mouse 13.

Power management circuitry 92 is also coupled to the ISA bus 58 for changing the system 10 between various power states (e.g., off, standby, sleep, suspend and normal operating states). The present invention will operate in any of these power states. Accordingly, the description which follows will be independent of power state.

The circuitry 92 is supplied with auxiliary power from the power supply 17 when the system 10 is in the off state so that it can monitor events which cause the system 10 to turn on. For example, when the system is in the off state and a telephone ring is detected by ring detect device 90, a wake on ring signal is sent from the device 90 through serial port 82 to the power management circuitry 92. In response to receiving this signal the circuitry 92 will cause system 10 to change to the normal operating state. The ring detect device 90 can be, for example, an external modem or any other device which can detect a telephone ring and generate the wake on ring signal to the circuitry 92. Such other devices can include motion sensors, voice activated sensors, light sensors, etc. In addition, an internal modem 91 could be connected directly to the ISA bus 58 or PCI bus 50. The modem 91 is wired to a modem pin on the planar 20 and is operative to generate the ring signal when it detects a telephone ring.

The circuitry 92 also includes a timer which is configurable by a user to expire after a predetermined period of time. When the timer expires, the circuitry 92 will cause the system 10 to change from the off state to the normal operating state.

A LAN adapter or subsystem 94 can be coupled to either the PCI bus 50 or the ISA bus 58 for allowing system 10 to communicate with a remote computer 34 or server over a LAN via a connection cable or link 36. The LAN adapter is supplied with auxiliary power (AUX5) from the power supply 17 when the system 10 is off. When the LAN adapter 94 is set in a wake up mode it scans all incoming frames from the LAN addressed to system 10 for a specific data frame. If the LAN adapter 94 scans a frame and does not find the specific data frame, it discards the frame and takes no further action. If the LAN adapter 94 detects the specific data frame, however, it alerts the power management circuitry 92 via a wake on LAN signal to power on the system 10 (i.e., change from the off state to the normal operating state). The LAN adapter can be, for example, an IBM Auto Wake Token-Ring ISA Adapter.

The LAN adapter 94 includes a Media Access Controller (MAC). The MAC serves as an interface between a shared data path (e.g., Ethernet serial data path) and the PCI bus 50 (or ISA bus 58 if adapter 94 were connected to the ISA bus 58). The MAC performs a number of functions involved in the transmission and reception of data packets. For example, during the transmission of data, the MAC assembles the data to be transmitted into a packet with address and error detection fields. Conversely, during the reception of a packet, the MAC disassembles the packet and performs address checking and error detection. In addition, the MAC typically performs encoding/decoding of digital signals transmitted over the shared path and performs preamble generation/removal as well as bit transmission/reception.

The LAN adapter 94 can further include a media independent interface (MII) (not shown) which is a local bus between the MAC and a physical layer. The physical layer receives parallel data from the MAC/MII local bus and converts it to serial data for transmission over cable 36. The physical layer is also responsible for wave shaping and provides analog voltages to cable 36. The LAN adapter 94 further includes a connector which is the physical interface between the adapter 94 and cable 36.

Alternative to the LAN adapter 94, a LAN connector or connection could be imbedded on the planar 20 and would include all the same connections and components as the adapter 94. Such a connector will be referred to as LAN subsystem 94.

A planar XBus 64 is coupled to the PCI bus 50 and ISA bus 58 via chipset 52. The planar XBus 64 includes address, data, and control components respectively. The planar XBus 64 is an additional IO bus in system 10 and is used as a local bus to support slow speed peripheral devices that reside on the planar board. Attached to the XBus 64 is a flash memory (FM) module or chip 66.

The flash memory 66 is an electrically erasable programmable read only memory (EEPROM) module or chip and includes the BIOS that is used to interface between the IO devices and the operating system. BIOS stored in memory 66 can be copied into RAM 48 to decrease the execution time of BIOS. FM 66 is further responsive to the XBus controller (via ROMSEL signal) within chipset 52. If System RAM 48 is disabled for the BIOS address range then access requests to that address range are passed through the host bridge 44 and the PCI/ISA bridge to memory 66. If System RAM 48 is enabled for the BIOS address range then access requests to that address range are directed to system RAM 48.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of a remote personal computer 34. While not here shown or described in detail, the remote computer system 34 has components and attributes like those illustrated and described with regard to FIG. 3 and those additional elements appropriate to provide the non-volatile storage mentioned, as is known to the person skilled in the appropriate arts. The remote computer system or remote management system 34 can be, for example, a client, a personal computer or a server. A storage means associated with the remote computer 34 can be a non-volatile means such as a direct access storage device (DASD) in the form of a hard disk device, diskette, compact disc or the like.

The local and remote computers 10, 34 are associated one with the other through some form of local area network (LAN) or the like, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer 34 may be some computer having capabilities other than those ascribed herein to a "personal computer", and possibly beyond those capabilities.

While the term "remote" is used with reference to the computer system 34 through which the LAN station local computer system 10 accesses BIOS, that term is used in the sense of indicating separation, rather than in the sense of indicating a large physical distance between the systems. In fact, such system may be physically adjacent in some network arrangements.

The system 10 has an erasable memory element mounted within the system enclosure for selective activation to active and inactive states and for receiving and storing a privileged access password (PAP) when in the active state. The erasable memory element preferably is an EEPROM 53 coupled to chipset 52 via a general purpose input/output (GPIO) pin. The system 10 also has an option or security switch mounted within the enclosure and operatively connected with the memory element 53 for setting that memory element to the active and inactive states. The option switch may be, for example, a jumper mounted on the system planar 20 and manually settable to two different states by a person having access to the planar. In one state (also known as the write enable state), the memory element 53 is set to be active and to store a PAP. In the write enable state, the PAP may be written to the memory element 53, changed or removed. In the other or inactive state, the PAP storage capability of the memory element 53 is set to be inactive.

As mentioned above, the system 10 also has a second component having erasable memory capabilities, namely a non-volatile RAM and an associated RTC indicated at 52 in FIG. 3. The NVRAM stores data indicative of the system configuration including, in accordance with the present invention, data regarding the successful entry of the PAP on power up of the system 10.

At least one tamper detection switch 100 (FIG. 4) is provided, mounted within the enclosure and operatively connected with the NVRAM 52 for detecting opening of the enclosure and for clearing certain data stored in NVRAM 52 in response to any switching of the tamper detection switch 100. A key lock switch (not shown) is also mounted within the enclosure and is normally held closed on locking of the enclosure lock which is conventionally supplied on the system 10.

The tamper detection switch 100 is preferably mounted on the front panel 24 so as to be appropriately positioned relative to the main enclosure cover 15. The tamper switch 100 is mounted in the computer system frame in such a position that an actuating lever 102 for the tamper switch 100 protrudes through an opening in the front panel 24 to be actuated by a stub 104 on the cover 15. When the cover 15 is positioned to enclose the system chassis 19, the stub 104 pushes lever 102 such that the switch 100 is closed. When the cover 15 is removed or opened, the lever 102 returns switch 100 to an open position.

FIG. 5 illustrates certain relationships among the power switch 21, the power supply 17, tamper detection switch 100 which changes conductive state in response to opening or removal of the main cover 15, and the keylock switch. The tamper switch 100 has two components, one normally open (100a) and one normally closed (100b). The normally open contact set of the cover switch 100 is connected in series with the power switch 21 and to the power supply 17. As a consequence, if an attempt is made to "power up" the system 10 with the main cover 15 removed, the contact set 100a will be open and prevent system operation. With the cover 15 in place, the contact set 100a is held closed and normal system operation may be initiated.

The normally closed contact set 100b of the tamper switch 100 is connected in series with the keylock switch 106 and to the RTC and NVRAM. The normally closed contact set 100b are held open by the presence of the cover 15 and will close on the removal of the cover 15. As noted above, the keylock switch 106 is normally held closed on locking of the enclosure lock which is conventionally supplied on the system 10. These contact sets provide an alternate path to ground for current otherwise energizing portions of the RTC and NVRAM, and have the effect of setting a segment of that memory to a distinctive state (such as all "1"s) if energization is lost, as upon unauthorized removal of the cover 15 while the system is in an enclosure locked state. As that memory is checked by POST, setting that segment to a distinctive state will result in a configuration error signal being generated which will alert a system owner that an attempt (successful or otherwise) has been made to breach system security. This setting of a memory segment to a distinctive state invalidates any previously stored power on password (POP) for purposes of booting an operating system from any source other than the system reference diskette or the system partition. Booting an operating system from either of the last mentioned sources requires entry of a valid PAP as otherwise disclosed in U.S. Pat. No. 5,388,156.

Password security is implemented by system hardware features; an EEPROM, the security switch and the tamper evident cover switch 100, firmware, POST and the system software password utility. Once the PAP has been installed, the system is in secure mode. The PAP is saved in the EEPROM 53. A backup copy of the PAP is also maintained in the EEPROM 53. This is done to prevent accidental loss of the PAP when a power failure occurs during the installation, change or removal of the PAP. The POP and at least certain bits indicative of the validity of the PAP (if installed) are stored in NVRAM 52. Changes in data retained in the NVRAM and in the EEPROM 53 are independent one from the other.

As mentioned above, the POP is maintained in NVRAM 52. Two bits will be maintained in NVRAM for use as password indicators for the PAP. One indicator is used to signify that the system is in secure mode (PAP installed). The second indicator is to signify that the PAP was entered during the initial power on, cold boot. These two indicators will be initialized and set at a cold boot only. Prior to initial program load (IPL), the indicators will be write protected unless the system reference diskette or system partition is booted, which requires the successful entry of any installed PAP. Changes in the POP and in the indicators are independent of any changes in the PAP stored in the EEPROM 53. However, changes in the NVRAM can indicate security violations which require entry of a valid PAP for recovery permitting the loading of an operating system.

To prevent any unauthorized access to the passwords, the IPL device boot list and all the indicators will be locked prior to IPL booting an operating system. To lockout these areas, POST will set special hardware latches that cannot be reset unless the system is powered off. At the beginning of POST Stage I (initial power on), POST will check to see if the EEPROM is locked. If it is locked, POST will display an error and halt the system because the hardware is not functional. The system owner will need to intervene to remedy the situation, which might require that the system board be replaced. In one exemplary form, when the system has been tampered with, the first 14 bytes of RAM storage in NVRAM associated with the RTC and control registers are unaffected. The next 50 bytes of NVRAM are set to all "1's" as briefly described above. Upon detecting this condition POST displays an appropriate error. In another form, as little as a single bit may be set to a state indicative of tampering. In either instance, the system owner/authorized user will need to intervene to remedy the situation which might require entry of the PAP at the password prompt to boot from the system reference diskette or the system partition or that the system board be re-configured.

If the system owner forgets the PAP, the system board(s) affected will need to be replaced. If the POP is forgotten, the system owner can toggle the tamper evident cover switch 100 to destroy the contents of NVRAM as described above, and then enter the PAP (if installed) to boot the System Reference Diskette or the System Partition to run the password utility, to reinstall the POP.

The present invention improves upon the tamper alert disclosed in U.S. 5,388,156 by connecting a tamper alert line to the LAN adapter 94 and notifying a LAN manager or system administrator when the cover 15 has been removed by an unauthorized person.

Figure 6:
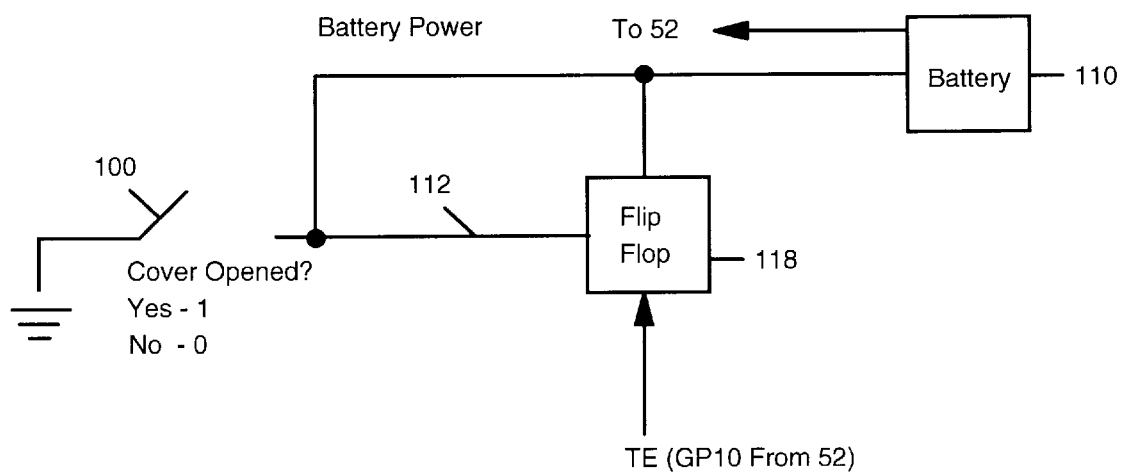
FIG. 6 is a schematic diagram of certain components of the personal computer of FIGS. 1 and 2 in accordance with the present invention.

Turning now to FIG. 6, there is shown a schematic diagram of certain components of the system 10 in accordance with the present invention. A system battery 110 supplies power to a tamper detection switch line 112 and a flip flop 118. The battery 110 is a 3 V battery that supplies power regardless of whether the system 10 is powered on or not (i.e., regardless of whether the power supply 17 is supplying system power or not).

As noted above, the tamper detection switch 100 changes state on opening or removal of the cover 15 such that if the cover is on, the switch 100 is closed and cover tamper switch line 112 will be a logical "0" (connected to ground). If the cover is removed the switch 100 is open and the line 112 will go to a logical "1" (battery powered).

The tamper switch line 1 12 is supplied to flip flop 118. A general purpose output line (tamper enable (TE)) from chipset 52 is connected to the flip flop 118. The general purpose output line is settable by a user to either enable the tamper alert (TE line active) or disable the tamper alert (TE line inactive).

In operation, if tamper alert is enabled via the TE line then, if the cover 15 is opened the tamper switch line 112 will be high. This state will be passed through the flip flop 118 such that the tamper alert line will be active. This condition will disable the system 10 such that no one can access the data stored therein as described above (PAP or POP invalidated). Of course, if the tamper alert is disabled via the TE line then regardless of whether the cover 15 is opened or not, the tamper alert line will always be disabled.

The tamper alert signal output from the flip flop 118 is supplied to the LAN adapter 94. The LAN adapter 94 is operative to receive the tamper alert signal and in response thereto, transmit an alert packet over the network line 36 to the remote computer 34. As mentioned above, the switch 100 will activate the tamper alert line if the cover is removed even if system power is off. In addition, the LAN adapter 94 is powered by auxiliary voltage (e.g., AUX 5) which is present so long as the system 10 is connected to AC power. Accordingly, the LAN adapter or subsystem 94 is able to send the alert packet over cable 36 when the system 10 is in any power state (normal operating, sleep, standby, suspend, off, etc.). This allows the system 10 to send the alert packet regardless of power state. This has the advantage that the present invention does not require the system 10 to be powered to a normal operating or ON state to operate.

The alert packet sent by the adapter 94 can be a broadcast or directed IP packet to the network server 34. This packet will be generated by the MAC within adapter 94 and the packet contains the IP and port address or the address of the destination server (e.g., system 34). The server 34 contains a software application that can either be a stand alone application or integrated into IBM's Netfinity network management software or Intel's LANDesk network management software. This application will be operative to receive the alert packet and process the information therein.

The alert packet also contains a defined field which indicates that an unauthorized cover tamper has occurred. The LAN address of the particular client system sending the packet is also contained within the packet. Each client has a unique address and the LAN manager or system administrator has a table which has the physical location of each address. The application program running on server 34 listens for alerts. When an alert packet is received, the server 34 displays a message to the operator via the operator's console or user interface. Thus, once system 34 receives the packet, the LAN manager will know the specific system 10 that has been broken into and where that system is located. The amount of time from the cover being opened to the alert packet being sent is less than one second. The person breaking into the system would not even be aware.

The present invention can be incorporated in Wake Up On LAN chipsets. Logic within adapter 94 is used to transmit the predefined alert packet when the tamper line is activated. When a tamper alert occurs, the logic takes over the MII bus. The logic then drives a packet across the MII bus to the physical layer. The adapter 94 builds the alert packet by pulling information from EEPROM 95 to initialize itself (MAC address, vendor ID, network type, etc.) and get the IP address, port address and data indicating tamper alert.

The present invention thus provides the advantage that the computer system can notify a system owner over a network when an unauthorized opening of the system enclosure has occurred. The amount of time from the cover being opened to the alert message being sent can be less than one second and the person breaking into the system would not even be aware. This can assist a system owner in protecting its assets from being stolen.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system coupled to a remote computer via a data communication line and being capable of securing data retained within the system against unauthorized access and notifying said remote computer when an unauthorized access has occurred, said system comprising:

a normally closed enclosure, an erasable memory element mounted within said enclosure for selective activation to active and inactive states and for receiving and storing a security password when in the active state, a manually operable option switch mounted within said enclosure, said option switch being operatively connected with said erasable memory element and manually settable by a user of the computer system for setting said erasable memory element to the active and inactive states, a tamper detection switch mounted within said enclosure and operatively connected with said erasable memory element for detecting opening of said enclosure and for generating a tamper alert signal and clearing any stored security password from said erasable memory element in response to any switching of said tamper detection switch, a central processing unit mounted within said enclosure and operatively connected with said erasable memory element for controlling access to at least certain levels of data stored within the system by distinguishing between the active and inactive states of said memory element and between entry and non-entry of any stored security password, a network connector in circuit communication with said CPU, said network connector being operative to receive said tamper alert signal and upon so receiving, transmit an alert packet over the communication line to said remote computer, said alert packet containing an alert message and information which specifically identifies said local computer system, and said network connector being supplied with auxiliary power and being operative to receive said tamper alert signal and generate said alert packet regardless of a power state that said computer system is in.

2. The computer system of claim 1, wherein said network connector is a connector selected from the group consisting of a LAN adapter and a LAN subsystem.

3. The computer system of claim 1, wherein said security password is a privileged access password.

4. The computer system of clam 1, further including a logic circuit coupled to said tamper detection switch, said logic circuit being settable by a user between an enabled state and a disabled state, wherein when said logic circuit is in the enabled state, said switching of said tamper detection switch clears said security password and wherein when said logic circuit is in said disabled state said switching of said tamper detection switch does not clear said security password.

5. The computer system of claim 1, wherein said computer system is in an off state.

6. A computer system coupled to a remote computer via a data communication line and being capable of securing data retained within the system against unauthorized access and notifying said remote computer when an unauthorized access has occurred, said system comprising:

a normally closed enclosure, a first erasable memory element mounted within said enclosure for selective activation to active and inactive states and for receiving and storing a privileged access password when in the active state, a manually operable option switch mounted within said enclosure and operatively connected with said first erasable memory element for setting said first erasable memory element to the active and inactive states, a second erasable memory element mounted within said enclosure for receiving and storing data indicative of the state of said first erasable memory element and of correct entry of any stored privileged access password, a tamper detection switch mounted within said enclosure and operatively connected with said second erasable memory element for detecting unauthorized opening of said enclosure and for generating a tamper alert signal and invalidating any privileged access password stored in said first erasable memory element in response to any switching of said tamper detection switch, a central processing unit mounted within said enclosure and operatively connected with said erasable memory elements for controlling access to at least certain levels of data stored within the system by distinguishing between the active and inactive states of said first memory element and between entry and non-entry of any valid stored privileged access password, a network connector in circuit communication with said CPU, said network connector being operative to receive said tamper alert signal and upon so receiving, transmit an alert packet over the communication line to said remote computer, said alert packet containing an alert message and information which specifically identifies said local computer system, and said network connector being supplied with auxiliary power and being operative to receive said tamper alert signal and generate said alert packet regardless of a power state that said computer system is in.

7. The computer system of claim 6, wherein said network connector is a connector selected from the group consisting of a LAN adapter and a LAN subsystem.

8. The computer system of claim 6, wherein said security password is a privileged access password.

9. The computer system of clam 6, further including a logic circuit coupled to said tamper detection switch, said logic circuit being settable by a user between an enabled state and a disabled state, wherein when said logic circuit is in the enabled state, said switching of said tamper detection switch clears said security password and wherein when said logic circuit is in said disabled state said switching of said tamper detection switch does not clear said security password.

10. A method of operating a computer system coupled to a remote computer via a data communication line, said computer system having an enclosure, a central processing unit mounted within the enclosure, a network connector for coupling said computer system to said communication line, a selectively activable erasable memory element mounted within the enclosure, a manually operable option switch mounted within the enclosure manually settable by a user of the computer system for setting the memory element to active and inactive states, and a tamper detection switch mounted within the enclosure for detecting opening of the enclosure, the method comprising the steps of:

manually setting the option switch and selectively setting the memory element into the active state, storing a privileged access password in the active memory element, controlling access to at least certain levels of data stored within the system by distinguishing between the active and inactive states of the memory element and between entry and non-entry of the privileged access password, invalidating the privileged access password stored in the memory element in response to any switching of the tamper detection switch, generating a tamper alert signal to said network connector in response to any switching of the tamper detection switch regardless of a power state that said computer system is in, and transmitting an alert packet over the communication line to said remote computer regardless of a power state that said computer system is in, said alert packet containing an alert message and information which specifically identifies said local computer system.

* * * * *